(12) United States Patent
Flanigan

(10) Patent No.: US 6,372,948 B1
(45) Date of Patent: *Apr. 16, 2002

(54) PROCESS AND APPARATUS FOR THE DESTRUCTIVE DISTILLATION OF RUBBER

(75) Inventor: V. J. Flanigan, Rolla, MO (US)

(73) Assignee: Gentech, Inc., Rolla, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/027,642

(22) Filed: Feb. 23, 1998

Related U.S. Application Data (63) Continuation of application No. 08/345,115, filed on Nov. 28, 1994, now Pat. No. 5,783,046.

(51) Int. Cl.$^7$ .................................................. C10G 1/10
(52) U.S. Cl. ............................ 585/241; 201/2.5; 201/25
(58) Field of Search ............................ 585/241; 201/2.5, 201/25

(56) References Cited

U.S. PATENT DOCUMENTS

| | | | |
|---|---|---|---|
| 2,131,702 A | 9/1938 | Berry | 202/228 |
| 3,573,194 A | 3/1971 | Hopper et al. | 208/11 |
| 3,619,405 A | 11/1971 | Smith | 202/221 |
| 3,644,131 A | 2/1972 | Gotshall | 106/307 |
| 3,822,218 A | 7/1974 | Whittaker et al. | 252/421 |
| 3,823,221 A | 7/1974 | Wakefield et al. | 423/449 |
| 3,875,007 A | 4/1975 | Sanga | 242/425 |
| 3,926,582 A | 12/1975 | Powell, Jr. et al. | 202/221 |
| 4,038,100 A | 7/1977 | Haberman | 106/37 |
| 4,145,258 A | 3/1979 | Fujishiro et al. | 202/248 |
| 4,172,769 A | 10/1979 | Becker, Jr. | 202/248 |
| 4,240,877 A | 12/1980 | Stahlherm et al. | 201/41 |
| 4,308,102 A | 12/1981 | Wagener et al. | 201/39 |
| 4,354,438 A | 10/1982 | Beckmann | 110/234 |
| 4,368,103 A | 1/1983 | Weinzierl et al. | 202/99 |
| 4,401,513 A | 8/1983 | Brewer | 202/97 |
| 4,402,791 A | 9/1983 | Brewer | 202/97 |
| 4,412,684 A | 11/1983 | Giertz | 277/135 |
| 4,507,174 A | 3/1985 | Kutrieb | 202/97 |
| 4,606,793 A | 8/1986 | Petrovic et al. | 201/39 |
| 4,718,984 A | 1/1988 | McConaghy, Jr. et al. | 202/99 |
| 4,740,270 A | 4/1988 | Roy | 201/35 |
| 4,881,947 A | 11/1989 | Parker et al. | 48/89 |
| 4,946,486 A | 8/1990 | Parker et al. | 55/479 |
| 5,084,141 A | 1/1992 | Holland | 201/19 |
| 5,096,210 A | 3/1992 | Wood et al. | 227/229 |
| 5,230,777 A | 7/1993 | Jarrell | 202/97 |
| 5,254,222 A | 10/1993 | Mazzini et al. | 202/248 |

OTHER PUBLICATIONS

"Pneuma–Seal Standard Designs" The Presray Corporation, pp. 8–12 (1995).

*Primary Examiner*—Walter D. Griffin
(74) *Attorney, Agent, or Firm*—Senniger, Powers, Leavitt & Roedel

(57) ABSTRACT

An improved process and apparatus for the destructive distillation or pyrolysis of rubber, such as used rubber tires, to produce liquid and gaseous hydrocarbons and a solid carbonaceous char. A heat transfer gas circulating in a circulation loop is used to cool the hot char produced in the distillation chamber of a distillation oven, the circulation loop having some means for removing the heat transferred to the heat transfer gas from the hot char. In one embodiment, two distillation ovens are operated in off-set, batchwise distillation cycles. The distillation cycles in the two ovens are coordinated so that a fresh charge of rubber feed is introduced into the distillation chamber of one of the ovens as the distillation of rubber in the other oven is concluded. The heat transfer gas is then circulated through both distillation chambers of the two ovens such that heat is transferred from the hot char produced in one oven at the end of a cycle to the heat transfer gas, and then transferred from the gas to the cold rubber feed introduced into the distillation chamber of the other oven at the beginning of a cycle to preheat the rubber feed. An effective means for determining the distillation end point and a pressurized distillation oven door seal are also provided.

11 Claims, 4 Drawing Sheets

PROCESS AND APPARATUS FOR THE DESTRUCTIVE DISTILLATION OF RUBBER

This application is a continuation of U.S. Ser. No. 08/345,115, filed Nov. 28, 1994, now U.S. Pat. No. 5,783,046.

BACKGROUND OF THE INVENTION

The present invention relates to an improved process and apparatus for the destructive distillation or pyrolysis of rubber, such as used rubber tires, to produce liquid and gaseous hydrocarbons and a solid carbonaceous char. More particularly, the invention is directed to an improved process and apparatus for preheating a rubber charge introduced into a distillation oven, cooling the char produced therein, determining the distillation end point and providing a substantially gas-tight distillation oven door seal.

Disposal of discarded rubber tires poses a significant environmental problem. Burning of used tires is undesirable, if not prohibited, due to the attendant air pollution, while landfilling essentially nonbiodegradable rubber rapidly depletes available landfill space.

In devising ways to more effectively dispose of used tires, particular attention has been paid to methods for recovering the raw materials present in scrap rubber. Generally, it is known that scrap rubber may be heated in a sealed distillation oven substantially free of oxygen under conditions of pressure and temperature such that the rubber disassociates into a vapor phase comprising the volatilized hydrocarbon components of the rubber and a solid carbonaceous char. At least some of the vapor phase withdrawn from the oven is, condensed to form various liquid hydrocarbon fractions which are separated from the remaining gaseous hydrocarbons. Both the liquid and gaseous hydrocarbons may be used as fuel sources and may even be recycled to the destructive distillation process to provide some or all of the fuel burned to heat the rubber. After the destructive distillation is complete, the oven and its contents are cooled and the solid carbonaceous char is removed from the oven. After processing to remove any steel scrap, the solid material that remains may be used as carbon black in the production of new tires or as a component in roadway asphalt.

Jarrell, U.S. Pat. No. 5,230,777, discloses a vacuum destructive distillation process and apparatus for recovering hydrocarbon fuel and carbon black from rubber tires. Jarrell describes the operation of two rubber distillation ovens in off-set, batchwise distillation cycles and the conservation of energy by using waste heat removed from one of the ovens during cooling to preheat the rubber charge in the other oven. To achieve this, the two ovens are connected by a valved pressure equalization line. At the end of the distillation cycle in one of the ovens, the pressure in the other oven, which contains a fresh charge of rubber feed, is reduced to provide a pressure differential between the two ovens. The pressure equalization line is then opened to produce a one-way flow of gas between the two ovens until the pressure is equalized. As a result of the gas flow, the oven in which the distillation cycle has just been completed and the rubber char contained therein is cooled and a small amount of the waste heat transferred to the other oven. The transferred waste heat preheats the rubber feed in the other oven, thereby conserving energy by reducing the amount of heat necessary for the distillation.

Although Jarrell achieves a certain degree of energy recovery, gas flow and heat transfer essentially stops as soon as the pressure in the two ovens has equalized. As a result, the waste heat in the cooling oven is not fully utilized in preheating the rubber charge in the other oven, nor does the waste heat from the cooling oven dissipate at an effective rate. Since considerable time must pass to allow the oven and its contents to cool before it can be opened and reloaded with a rubber charge, the processing capacity of the system is limited. Another difficulty encountered in Jarrell and other prior art rubber distillation systems is the inability to accurately determine the end point of rubber pyrolysis so as to consistently obtain a char of desired composition. Furthermore, the door seals on ovens of destructive distillation apparatus often leak during operation due to thermal warping of the door and housing. Leaks in an oven door seal decrease the quality of the hydrocarbon vapor produced and compromise the safety of the apparatus.

SUMMARY OF THE INVENTION

Among the objects of the present invention, therefore, may be noted the provision of an apparatus and process for the destructive distillation of rubber to produce hydrocarbon and a solid carbonaceous char in which energy conservation is improved; the provision of such an apparatus and process in which the cooling time between distillation cycles is effectively reduced to increase the system's processing capacity; the provision of such an apparatus and process in which the end point of rubber distillation can be easily and consistently determined; and the provision of an improved door seal for a destructive distillation oven which substantially inhibits the flow of air into the oven despite thermal warping of the door and housing.

Briefly, therefore, the present invention is directed to a process for the destructive distillation of rubber to produce hydrocarbon and a solid carbonaceous char. The process comprises heating rubber in the substantial absence of oxygen to a temperature sufficient to pyrolyze the rubber, distill a vapor comprising hydrocarbon from the rubber, and produce a solid carbonaceous char. The vapor produced is partially condensed to produce a liquid fraction comprising hydrocarbon and a remaining gaseous fraction. The carbonaceous char is contacted with a heat transfer gas to transfer heat from the char to the gas and thereby cool the char. The heat transfer gas circulates in a circulation loop which comprises means for removing the heat transferred to the gas from the char.

The invention is further directed to a process for the destructive distillation of rubber to produce hydrocarbon and a solid carbonaceous char. The process comprises loading a charge of rubber into a first distillation chamber and heating the rubber charge in the substantial absence of oxygen to a temperature sufficient to pyrolyze the rubber, distill a vapor comprising hydrocarbon from the rubber, and produce a solid carbonaceous char. The hydrocarbon containing vapor produced is partially condensed to produce a liquid fraction comprising hydrocarbon and a remaining gaseous fraction. A second charge of rubber is loaded into a second distillation chamber and a heat transfer gas is circulated between the first distillation chamber and the second distillation chamber so that the gas contacts carbonaceous char in the first chamber and contacts the second rubber charge in the second chamber. Circulation of the heat transfer gas results in heat being transferred from the carbonaceous char to the gas in the first chamber and heat being transferred from the gas to the second rubber charge in the second chamber, thereby cooling the char in the first chamber and preheating the second charge in the second chamber.

The invention is further directed to a process for the destructive distillation of rubber to produce hydrocarbon and a solid carbonaceous char. The process comprises heating a rubber charge in a distillation chamber in the substantial absence of oxygen to a temperature sufficient to pyrolyze the rubber, distill a vapor comprising hydrocarbon from the rubber charge and produce a solid carbonaceous char. The vapor produced is partially condensed to produce a liquid fraction comprising hydrocarbon and a remaining gaseous fraction. The weight loss of the rubber charge in the chamber as a result of pyrolysis is monitored and the heating of the rubber charge is discontinued in response to the weight loss of the rubber charge or a function of the weight loss of the rubber charge.

The invention is further directed to an apparatus for the destructive distillation of rubber to produce hydrocarbon and a solid carbonaceous char. The apparatus comprises a distillation chamber for holding the rubber. The chamber is sealable for the substantial exclusion of oxygen from the chamber. A heating means is associated with the distillation chamber for heating rubber in the chamber to a temperature sufficient to pyrolyze the rubber, distill a vapor comprising hydrocarbon from the rubber, and produce a solid carbonaceous char. Also included in the apparatus are means for removing the hydrocarbon-containing vapor from the chamber and means for condensing hydrocarbon from the vapor removed from the chamber to produce a liquid fraction comprising hydrocarbon. The apparatus further comprises means for circulating a heat transfer gas in a circulation loop, the heat transfer gas passing through the chamber and contacting the carbonaceous char to transfer heat from the char to the gas and thereby cool the char and means for removing heat from the heat transfer gas circulating in the circulation loop.

The invention is further directed to an apparatus for the destructive distillation of rubber to produce hydrocarbon and a solid carbonaceous char. The apparatus comprises two distillation chambers for holding the rubber. The chambers are sealable for the substantial exclusion of oxygen from the chambers. A heating means is associated with each distillation chamber for heating rubber in the chambers to a temperature sufficient to pyrolyze the rubber, distill a vapor comprising hydrocarbon from the rubber, and produce a solid carbonaceous char. Also included in the apparatus are means for removing the hydrocarbon-containing vapor from the chambers and means for condensing hydrocarbon from the vapor removed from the chambers to produce a liquid fraction comprising hydrocarbon. The apparatus further comprises means for circulating a heat transfer gas in a circulation loop, the heat transfer gas passing through both of the distillation chambers such that the gas contacts solid carbonaceous char in one of the chambers and contacts a rubber charge in the other chamber. Heat is thereby transferred from the carbonaceous char to the heat transfer gas in the one chamber to cool the char while heat is transferred from the gas to the rubber charge in the other chamber to preheat the charge.

The invention is further directed to an apparatus for the destructive distillation of rubber to produce hydrocarbon and a solid carbonaceous char. The apparatus comprises a distillation chamber for holding a rubber charge. The chamber is sealable for the substantial exclusion of oxygen from the chamber. A heating means is associated with the chamber for heating the rubber charge in the chamber to a temperature sufficient to pyrolyze the rubber, distill a vapor comprising hydrocarbon from the rubber, and produce a solid carbonaceous char. Also included in the apparatus are means for removing the hydrocarbon-containing vapor from the chamber and means for condensing hydrocarbon from the vapor to produce a liquid fraction comprising hydrocarbon. The apparatus further comprises means for monitoring weight loss of the rubber charge in the chamber as a result of pyrolysis.

The invention is further directed to a pyrolysis oven comprising a housing defining an internal distillation chamber, an opening in the housing providing access to the distillation chamber. A door adjacent the housing is movable between closed and open positions. In the closed position the door substantially covers the opening and a gap is defined between the door and the housing. In the open position the door is positioned away from the opening to provide access to the distillation chamber through the opening. An inflatable sealing tube member, generally annular in shape, is attached to one of the door and the housing adjacent the periphery of the opening so that the tube member is disposed within the gap when the door is in its the closed position. The oven further comprises means for introducing a fluid into the sealing tube member to inflate the tube member so that it sealingly engages the other of the door and the housing around the opening when the door is in its the closed position.

Other objects and features of this invention will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
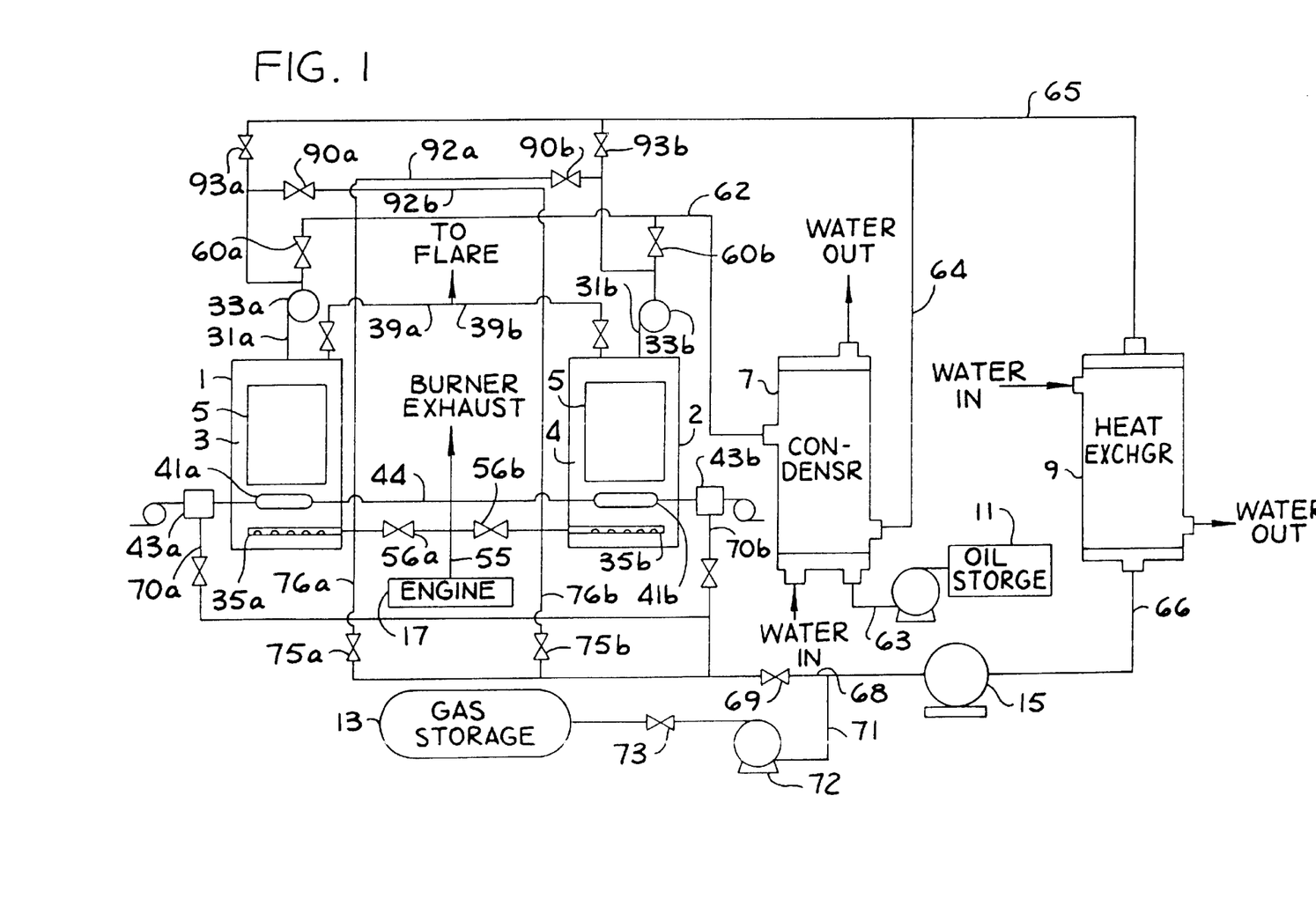
FIG. 1 is a schematic diagram of a process and apparatus for the destructive distillation of rubber according to the present invention.

A schematic diagram of the process and apparatus of the present invention is illustrated in FIG. 1. The apparatus generally comprises two distillation ovens 1 and 2 comprising distillation chambers 3 and 4, respectively, containers or trucks 5 for the rubber feed, a condenser 7, a heat exchanger 9, liquid hydrocarbon storage tank 11, gaseous hydrocarbon storage tank 13, a system blower 15 and an internal combustion engine 17 which serves as a source of substantially oxygen-free purge gas.

According to the present invention, distillation ovens 1 and 2 are operated in off-set, batchwise distillation cycles. The distillation cycles in ovens 1 and 2 are coordinated so that a fresh charge of rubber feed is introduced into the distillation chamber of one of the ovens as the distillation of rubber in the other oven is concluded. A heat transfer gas is then circulated through the distillation chamber of the oven in which the distillation of rubber has just concluded to provide an effective means of reducing the time needed to cool the hot char contained therein. Preferably, the heat transfer gas is circulated between ovens 1 and 2 through distillation chambers 3 and 4, respectively, such that heat is transferred from the hot char produced in one oven at the end of a cycle and used to preheat cold rubber feed introduced into the distillation chamber of the other oven at the beginning of a cycle. This reduces the amount of heat energy which must be supplied to the system. Thus, the preferred distillation cycle for ovens 1 and 2 includes: (1) placing trucks loaded with rubber feed into the oven; (2) preheating the cold rubber charge by circulating the heat transfer gas through the distillation chambers of the two ovens such that the gas contacts the rubber charge in the oven and hot char in the other oven; (3) continuing to heat the rubber charge in the first oven in the substantial absence of oxygen to destructively distill the rubber and produce a vapor comprising gaseous hydrocarbon and a hot, solid carbonaceous char; and (4) cooling the char produced in the first oven by transferring heat from the hot char to a cold rubber charge introduced into the other oven by again circulating a heat transfer gas through the distillation chambers of the two ovens. The process is described in greater detail below.

Raw rubber in the form of used tires and other discarded scrap rubber may be prepared as feed by shredding the rubber in a conventional shredder to reduce the average piece size. Reducing the piece size of the rubber feed facilitates loading the rubber feed into trucks 5 for insertion into ovens 1 and 2 as well as increases load size and the exposed surface area of the rubber feed. Typically, tires have a bulk density of about 160 kg/m$^3$ before shredding which increases to about 288 kg/m$^3$ after reduction. Uniformity in piece size is not required.

Alternatively, whole tires can be used as feed to the process and apparatus of the present invention. By using whole tires, the considerable capital and maintenance costs and safety hazards associated with a tire shredder can be avoided. Whole tires may be placed directly into trucks 5. However, the bulk density of whole tires significantly reduces the load size. Therefore, if whole tires are used, it is preferred that the bulk density of the tires be increased prior to loading them into trucks 5. This can be achieved by forming an assembly of whole rubber tires and compressing the assembly of tires to thereby increase the bulk density of the assembly.

Figure 2A:
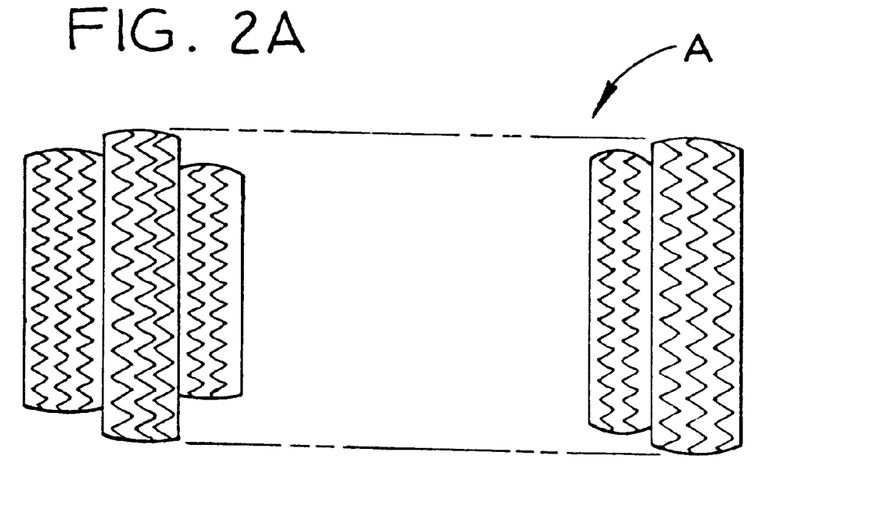
FIG. 2A is a perspective view of a plurality of whole rubber tires formed into an assembly by arranging the tires coaxially such that sidewall portions of adjacent tires in the assembly are in substantial face-to-face contact.
Figure 2B:
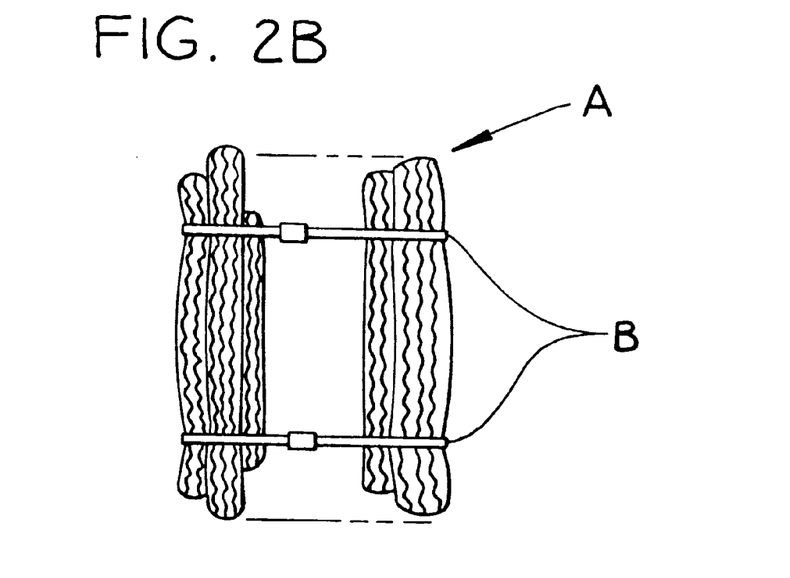
FIG. 2B is a perspective view of a bale of whole rubber tires formed by compressing the assembly of tires shown in FIG. 2A and retaining the assembly of tires in its compressed condition.

As shown in FIG. 2A, a suitable assembly A of tires may be formed by arranging a plurality of tires coaxially such that sidewall portions of adjacent tires in the assembly are in substantial face-to-face contact. The bulk density of the assembly of tires is increased by compressing the assembly as shown in FIG. 2B. Preferably, the bulk density of the assembly of tires is increased to at least about 250 kg/m$^3$, more preferably to at least about 280 kg/m$^3$. The assembly of tires may be compressed by any suitable means, including squeezing the assembly of tires between opposing pressure plates of a hydraulic or mechanically activated press. Once compressed to the desired bulk density, the assembly of tires is retained in its compressed condition as a bale for loading into trucks 5. Preferably, as shown in FIG. 2B, the compressed condition of the assembly of tires is retained by binding the assembly with at least one loop of flexible material B. The loop of flexible material may be in the form of a web or cord and be made of any material capable of withstanding the force exerted by the compressed assembly of tires, such as metal or plastic. In an especially preferred embodiment, the material used to form the loops binding the compressed assembly of tires thermally degrades and eventually ruptures as the assembly is heated during distillation.

When the loops rupture, the assembly of tires is allowed to expand within the truck 5 and an increased surface area of rubber is exposed. Particularly good results can be achieved by baling approximately 17 to 20 tires in the manner shown in FIG. 2B using loops made of plastic to retain the assembly of tires in its compressed condition.

Figure 3:
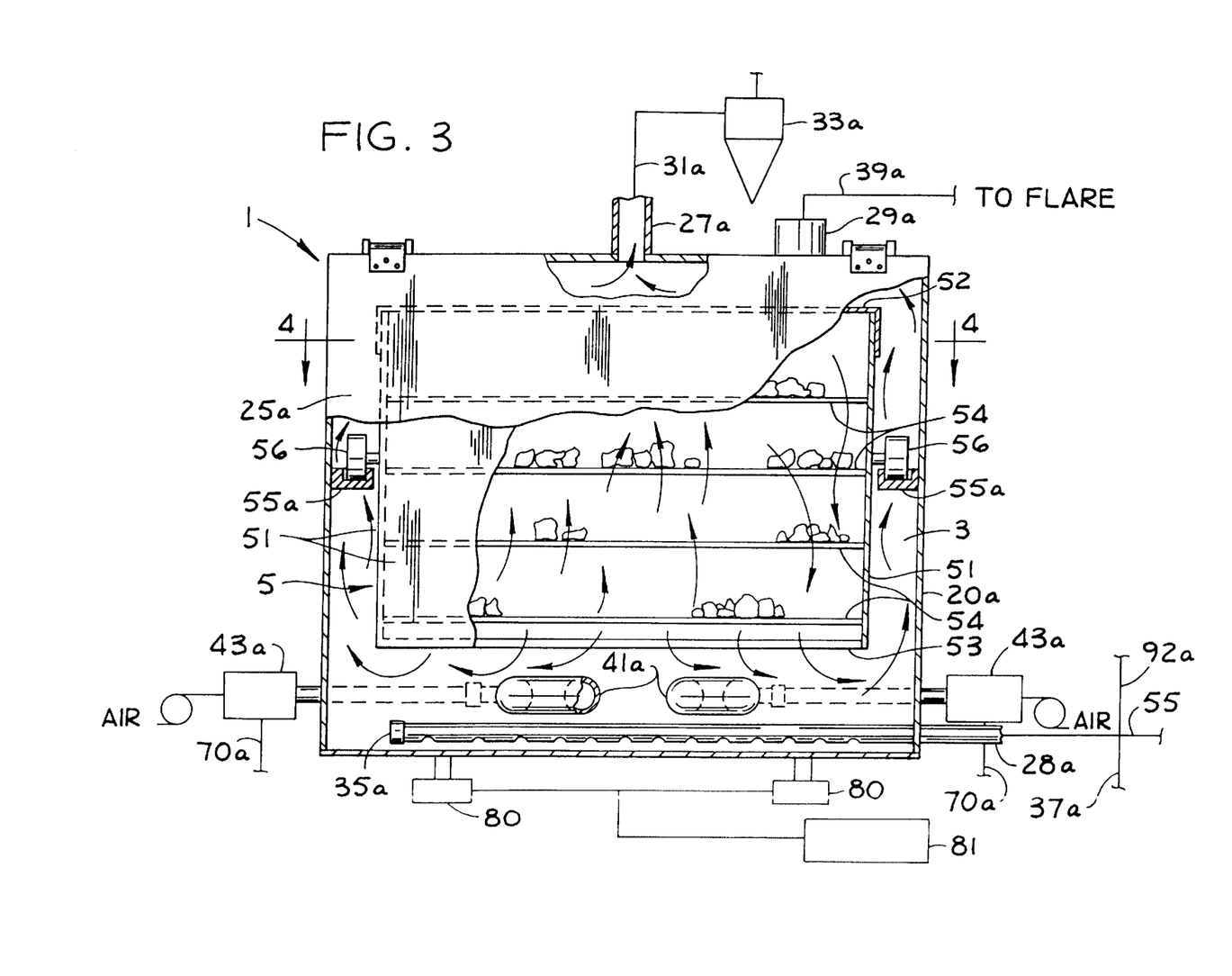
FIG. 3 is a front elevational view of distillation oven suitable for use in accordance with the present invention with part broken away to reveal its interior.

To initiate the process, one or more trucks 5 loaded with shredded rubber feed or baled whole tires are placed within one of the distillation ovens. FIG. 3 shows a front elevational view of distillation oven 1 with part broken away to reveal its interior. Distillation ovens 1 and 2 are of essentially identical construction. Thus, in the following description, discussion with regard to the construction and operation of oven 1 should be understood to apply equally to oven 2. Furthermore, numeral designations corresponding to components associated with oven 1 are followed by an "a", while numeral designations corresponding to identical components associated with oven 2 are followed by a "b".

Oven 1 comprises a housing 20a constructed to withstand design operating pressures and internal temperatures in excess of 650° C. Suitable material of construction for housing 20a includes reinforced steel lined with sheets or bricks of a refractory material. Housing 20a defines generally rectilinear distillation chamber 3 enclosed within the oven. As shown in FIG. 3, chamber 3 has internal dimensions sufficient to accommodate at least one truck 5 filled with rubber scrap. Trucks may be placed within and removed from chamber 3 through an opening in housing 20a that is selectively opened and closed by means of a door 25a. Door 25a may be made from the same material that comprises housing 20a and, as shown, may be attached to the top of the housing by hinges.

Housing 20a is further provided with a gas outlet 27a a gas inlet 28a, and a vent 29a. Gas outlet 27a is connected via line 31a to cyclone 33a. Gas inlet 28a is in flow communication with a gas distributor 35a located within distillation chamber 3. Gas distributor 35a comprises a heat-resistant hollow tube closed on the end opposite inlet 28a and having a plurality of perforations along its length in flow communication with chamber 3. As shown in FIG. 3, the perforations are preferably located along the underside of the tube. Vent 29a is connected to a flare via line 39a.

Oven 1 further comprises means for heating the distillation chamber 3 and the rubber contained therein to a temperature sufficient to distill a vapor comprising hydrocarbon from the rubber and produce a solid carbonaceous char. The heating means preferably comprises a radiant heating assembly which includes means for producing radiant heat within chamber 3. As shown in FIG. 3, such means may be in the form of one or more U-shaped radiant heating tubes 41a positioned within a lower zone of chamber 3 beneath the charge of rubber contained within truck 5. Heating tubes 41a can be formed of high temperature stainless steel or ceramic, either of which must have a capability of withstanding internal temperatures up to at least about 900° C. Radiant heat is preferably produced within the chamber 3 by combusting a hydrocarbon gas within the heating tubes 41a. Thus, one end of each tube is connected to a gas burner 43a which provides an ignition source and a mixture of hydrocarbon and an $O_2$-containing gas, preferably air, to that end of the tube. For purposes of simplicity, ovens 1 and 2 are shown in FIG. 1 as having a single heating tube 41a and 41b and associated gas burner 43a and 43b, respectively. The end of each tube 41 opposite the burner 43 is connected to a burner exhaust line 44.

The burners 43 operate by producing a slow laminar mixing of the fuel gas and air in tubes 41. This slow burning provides a flame front over a large section of tubes 41, resulting in high heat transfer coefficients and large energy transfer to distillation chambers 3 and 4 and trucks 5 contained therein. Hot combustion gas flows through the U-shaped tubes 41 and radiant heat transfer is obtained from the tube walls to the rubber charge in the distillation zone. The distillation zone consists of the space defined by the interior walls of the distillation chamber and the exterior surfaces of the walls of heating tubes 41 and contains the rubber charge with which it is in fluid flow communication. The radiant heating assembly adds heat energy directly to the distillation chambers, resulting in fast response, high efficiencies and allowing simple temperature control. The radiant heating assembly is preferred over conventional gas burners because radiant heating permits heat to be added efficiently and directly to the chambers without introducing oxygen. Furthermore, the performance of the ovens is greatly improved and the cost of construction substantially reduced as compared to conventional shroud systems.

The truck 5 shown in FIG. 3 within oven 1 is adapted to hold shredded rubber feed. The truck 5 is a generally rectangular receptacle having sides 51, a top cover 52 and a bottom 53 made of suitably heat resistant material. At least one of sides 51, top cover 52 or bottom 53 is made of expanded metal to allow the hydrocarbon-containing vapor produced during distillation to exit the truck 5. The truck 5 contains one or more vertically-spaced trays 54 for supporting shredded rubber scrap. One of the sides 51 is removable to allow access to the interior of the truck. This allows truck 5 to be easily loaded with rubber scrap by simply tipping the truck onto a side with the removed side facing upward so that a flow of rubber shreds from the shredder can be diverted into exposed slots between the trays 54 in the truck. Once filled, the side is replaced and the truck 5 rotated back to its normal, upright position, ready for insertion into the distillation oven. As the distillation process proceeds, the rubber shrinks and a layer of solid carbonaceous char settles on each tray 54 with a void space being formed between the top of the char on each tray and the bottom of the tray immediately above. By separating the char into relatively shallow, vertically spaced bed fractions, the weight of the char product in the truck is prevented from causing the char at the bottom to be compressed into an impenetrable mass from which the hydrocarbon-containing vapor might otherwise have difficulty escaping, and through which the vapor otherwise could not flow without excessive pressure drop.

Alternatively, trucks adapted to hold shredded rubber feed can be constructed without interior trays, and be loaded through a removable top cover. In such an embodiment, the trucks preferably further comprise several removable, vertically-spaced grates, each comprising an array of parallel bars joined at one end. The grates are inserted into the truck after it is filled with rubber scrap by passing the free end of the bars through corresponding holes in opposite sides of the truck so that the grates extend horizontally across the bed of rubber in the truck. The grates, like the trays, provide spacing within the bed of rubber as it is distilled to ensure uniform gas flow and heating. Using grates in place of trays in the truck makes it easier to unload char from the truck after the truck has been removed from the distillation oven. When unloading, the truck is simply positioned over a char collection chute and the grates are withdrawn from the truck. The bottom of the truck is removed or otherwise opened to allow the char to fall into the collection chute. Vertical unloading of the char is desirable since it reduces the formation of dust and reduces the need for forklifts or other hydraulic equipment, increasing safety and efficiency.

If baled whole rubber tires are used as feed, the trucks are preferably constructed without interior trays to accommodate the bales. Preferably, the trucks used with baled whole tires have one or more horizontal posts extending from an interior side surface of the truck upon which one or more bales of whole tires may be hung. During distillation, the whole tires degrade and the resulting char collects on the bottom of the truck while any metal belts or beading components of the tires remain on the posts so that they may be easily separated from the char.

The holding capacity of the trucks can vary, depending upon the size of the distillation chamber within the oven. A preferred truck is capable of holding at least 12,000 pounds of rubber scrap and can be loaded into the distillation oven by any suitable means, such as by forklift.

As shown in FIG. 3, tracks 55a extending along opposite interior walls of housing 20a provide a means for supporting the truck 5 in spaced relation to heating tubes 41a. The truck 5 has wheels 56 mounted on the exterior of two opposite vertical sides 51 which align with and rotate within tracks 55a allowing the truck to be moved within the oven.

The process of the present invention is now described in greater detail.

Once oven 1 has been loaded with one or more trucks containing rubber, door 25a is closed to seal distillation chamber 3. Oven 1 is then purged of oxygen by introducing a substantially oxygen-free purge gas into distillation chamber 3. As shown in FIG. 1, the exhaust from internal combustion engine 17 serves as a source of purge gas. To purge distillation chamber 3 of oxygen, exhaust from engine 17 is directed via line 55 and valve 56a to gas inlet 28a of oven 1 and flows into distillation chamber 3 through gas distributor 35a. The engine exhaust flows through distillation chamber 3 and is vented to a flare via vent 29a and line 39a. The flow of engine exhaust through oven 1 is maintained until distillation chamber 3 is substantially free of oxygen.

Heating of the rubber charge is commenced by igniting gas burners 43a of oven 1. Distillation chamber 3 and its contents are heated to a temperature of from about 300 to about 650° C., preferably from about 400 to about 500° C. and most preferably from about 425 to about 450° C. As a result of the heating, the rubber feed is pyrolyzed (i.e., destructively distilled) forming char and a vapor comprising gaseous hydrocarbon, carbon monoxide and carbon dioxide.

The process of the present invention may comprise heating the hydrocarbon-containing vapor above its dew point with respect to the hydrocarbon to produce a superheated vapor. Heat may then be transferred from the superheated vapor to the rubber charge to contribute supplemental heat energy for distillation of hydrocarbon from the rubber.

One way of superheating the hydrocarbon-containing vapor and transferring heat from the superheated vapor to the rubber charge is illustrated by the oven and truck design shown in FIG. 3. The sides 51 and top cover 52 of truck 5 are of solid metal construction while the bottom 53 and vertically-spaced trays 54 within the truck are made of expanded metal. When this truck design is employed, the hydrocarbon-containing vapor produced upon heating the rubber cannot exit through the sides 51 or top cover 52 of truck 5. Instead, pressure builds slightly within truck 5 during heating and forces the vapor produced to exit bottom 53 of the truck as shown by the arrows in FIG. 3. The exiting vapor is heated above its dew point with respect to the hydrocarbon component as it passes over and contacts the radiant heating tubes 41a positioned in the lower zone of chamber 3. The superheated hydrocarbon vapor flows upward along the sides 51 of truck 5 so that supplemental heat energy for distillation of hydrocarbon from the rubber is transferred indirectly from the superheated vapor to the rubber through the sides of the truck. Preferably, the hydrocarbon vapor exiting the bottom of truck 5 is heated by contact with the radiant heating tubes 41a to increase its temperature by at least about 10° C., preferably by at least about 20° C.

Blower 15 is in flow communication with distillation chambers 3 and 4 of oven 1 and 2, respectively, and its operation provides the motive force for the flow of process gas through the system. The pressure differential across blower 15 induces the hydrocarbon-containing vapor to flow from distillation chamber 3 of oven 1 via outlet 27a and line 31a. The vapor flows into cyclone 33a where large particulates entrained in the vapor are removed. The vapor exiting cyclone 33a is directed via valve 60a into line 62 for delivery to condenser 7. In condenser 7, the vapor is cooled by transfer of heat to a cooling fluid (e.g., water), producing a liquid fraction comprising hydrocarbon oil and a remaining gaseous fraction comprising noncondensable hydrocarbon components of the distilled vapor. The liquid fraction is directed from condenser 7 via line 63 to liquid storage tank 11. The remaining gaseous fraction exits condenser 7 and flows via lines 64 and 65 to heat exchanger 9. Preferably, the remaining gaseous fraction exits condenser 7 at a temperature no higher than about 50° C. In heat exchanger 9, the remaining gaseous fraction is further cooled, preferably to a temperature no higher than about 35° C., more preferably no higher than about 30° C. As shown in FIG. 1, both condenser 7 and heat exchanger 9 preferably use cooling water as the means for removing heat from the process gas. The heat recovered in condenser 7 and heat exchanger 9 may be used to heat personnel areas in the plant or be put to some other useful purpose.

The cooled remaining gaseous fraction exits heat exchanger 9 via line 66 and flows through blower 15. In a preferred embodiment of the invention, shown in FIG. 1, gas burners 43 are fueled by the gaseous hydrocarbon products of the process. Thus, some of the cooled hydrocarbon-containing process gas exiting blower 15 may be delivered directly to burners 43a or 43b via line 68, valve 69 and fuel lines 70a or 70b, respectively. Excess hydrocarbon-containing process gas is directed to storage tank 13 via line 71, pump 72 and valve 73.

During heating and distillation, the pressure within the distillation chambers is preferably maintained at or near atmospheric pressure. For example, the gauge pressure in the distillation chambers may range from about −10 mm Hg to about +10 mm Hg. Although the process of the present invention may be adapted for vacuum distillation of the rubber (e.g., distillation chamber gauge pressure of −150 mm Hg or lower), vacuum distillation needlessly complicates and reduces the safety of the process and apparatus and is therefore generally less preferred. The pressure in the distillation chamber is maintained at or near atmospheric pressure by controlling the rate at which the hydrocarbon-containing vapor is withdrawn from the oven such that vapor is withdrawn from the oven at a rate essentially equal to the rate of vapor production.

Heating and distillation of the rubber charge contained in oven 1 continues until the volatile content of the char has been reduced to a desired level. The composition of the char and distillation end point is determined by means for monitoring weight loss of the rubber charge as a result of pyrolysis. The heating of the rubber is then discontinued in response to the weight loss of the rubber or a function of the weight loss of the rubber. Preferably, as shown in FIG. 3, the weight loss monitoring means comprises one or more load cells 80 positioned under the oven in contact with the housing 20a so that the weight of the oven and its contents rests on the load cells. Load cells 80 monitor the weight loss of the rubber charge in the oven as the distillation process proceeds. Data from load cells 80 are sent to a system computer 81 which plots weight loss as a function of time. Once the rate of weight loss approaches zero or any other desired value, the distillation process is concluded and heating terminated by extinguishing burners 43a of oven 1. Monitoring the weight loss of the rubber charge allows the end-point of the distillation process to be easily determined so as to obtain a char of consistent composition.

During heating and distillation of the rubber charge in oven 1, one or more trucks loaded with rubber feed are placed within the distillation chamber 4 of oven 2 which is then sealed. After sealing, distillation chamber 4 is purged of oxygen by introducing the substantially oxygen-free purge gas. Exhaust from engine 17 is directed via line 55 and valve 56b to gas inlet 28b and flows into distillation chamber 4 of oven 2 through gas distributor 35b. The engine exhaust flows through distillation chamber 4 and is vented to the flare via vent 29b and line 39b. The flow of engine exhaust through oven 2 is maintained until distillation chamber 4 is substantially free of oxygen.

Once heating in oven 1 has concluded, the char product contained therein is cooled by circulating a heat transfer gas through distillation chamber 3 to provide an effective means of reducing the time needed to cool the hot char. Preferably, the heat transfer gas comprises process gas circulated in a circulation loop between distillation chambers 3 and 4 by blower 15.

The heat transfer gas contacts the hot carbonaceous char in oven 1 such that heat is directly transferred from the carbonaceous char to the gas, thereby cooling the char. The heat transfer gas then exits oven 1 through outlet 27a and flows via line 31a to cyclone 33a. The gas exiting cyclone 33a flows via valve 90a through line 92b connected to inlet 28b of oven 2. The heat transfer gas flows through distributor 35b and into distillation chamber 4. As the heat transfer gas flows through distillation chamber 4, the gas contacts the cool rubber feed such that heat is directly transferred from the gas to the rubber to thereby preheat the rubber charge. The heat transfer gas exits oven 2 through outlet 27b and flows via line 31b to cyclone 33b. Heat transfer gas exiting cyclone 33b flows via valve 93b and line 65 to heat exchanger 9 where it is cooled. The heat transfer gas exiting the heat exchanger is preferably cooled to at least about 35° C. and more preferably to at least about 30° C. If the desired degree of cooling cannot be achieved with heat exchanger 9 alone, the heat transfer gas exiting oven 2 may first be directed via valve 60b and line 62 to the condenser 7.

The cooled heat transfer gas exiting heat exchanger 9 flows via line 66 to blower 15 and is recirculated back to oven 1 via line 68, valve 69, valve 75a and line 76a. The heat transfer gas flows through inlet 28a of oven 1, through distributor 35a and into distillation chamber 3 where it again contacts and cools the char. Circulation of the heat transfer gas continues in this manner for a time sufficient that the temperature differential between the char in oven 1 and the rubber charge in oven 2 is preferably less than about 10° C., and more preferably until these temperatures have substantially equalized. During this cooling period, combustion air may be passed through the radiant heating tubes 41a of oven 1 to assist in cooling the oven and its contents.

After the temperatures in the two distillation chambers have substantially equalized, heating of the rubber charge in oven 2 is continued by igniting gas burners 43b. The distillation of the rubber charge in oven 2 proceeds as described above with regard to oven 1. If desired, the cooling of the char contained in oven 1 may continue by circulating a portion of the cooled remaining gaseous fraction obtained from the distillation of rubber in oven 2 through distillation chamber 3.

Although the preferred system shown in FIG. 1 illustrates circulating the heat transfer gas in a circulation loop passing through the distillation chamber of both ovens, it should be understood that the present invention is not limited to a system in which the heat transfer gas passes through the distillation chamber of an oven containing cold rubber feed as the means for removing the heat transferred to the gas from the char. All that is required is that a heat transfer gas be circulated through the distillation chamber of the oven containing hot char in a circulation loop comprising some means (e.g., a heat exchanger) for removing the heat transferred to the gas from the hot char. For example, after cooling hot carbonaceous char in oven 1, heat transfer gas exiting cyclone 33a may simply flow via valve 93a through line 65 to heat exchanger 9 where it is cooled. If the desired degree of cooling cannot be achieved with heat exchanger 9 alone, the heat transfer gas exiting oven 1 may first be directed via valve 60a and line 62 to the condenser 7. The cooled heat transfer gas exiting heat exchanger 9 then flows via line 66 to blower 15 and is recirculated back to oven 1 via line 68, valve 69, valve 75a and line 76a. The heat transfer gas flows through inlet 28a of oven 1, through distributor 35a and into distillation chamber 3 where it again contacts and cools the char.

Once oven 1 and its contents have been cooled to the desired temperature, door 25a is opened and the char-containing trucks removed. In addition to providing an effective means of heating the rubber charge, the truck design shown in FIG. 3 having solid sides and top cover reduces the risk of flash fires occurring upon withdrawal of the truck 5 from the oven. Flash fires are encountered when char that has not been sufficiently cooled is removed from the oven and exposed to air (oxygen) resulting in spontaneous ignition of the char. The risk of flash fire is reduced by use of the truck design shown in FIG. 3 because there is no flow path for air to pass through the truck when the truck is removed from the oven. By reducing the risk of flash fires, the trucks can be removed from the ovens at a higher temperature and allowed to cool in a cooling area outside of the oven, further reducing the cycle time.

After oven 1 has been unloaded, trucks containing fresh rubber feed are loaded into oven 1, door 25a is sealed and distillation chamber 3 is purged of oxygen in preparation for the next cooling period at the end of the distillation cycle in oven 2. Once heating in oven 2 has concluded, the char product contained therein is cooled in a fashion similar to that previously described with respect to oven 1 by circulating a heat transfer gas through distillation chamber 4.

Circulating heat transfer gas contacts the hot carbonaceous char in oven 2 thereby cooling the char. The heat transfer gas exits oven 2 through outlet 27b and flows via line 31b to cyclone 33b. The gas exiting cyclone 33b flows via valve 90b through line 92a connected to inlet 28a of oven 1. The heat transfer gas flows through distributor 35a and into distillation chamber 3. As the heat transfer gas flows through distillation chamber 3, the gas contacts the cold rubber feed such that heat is directly transferred from the gas to the rubber to thereby preheat the rubber charge. The heat transfer gas then exits oven 1 through outlet 27a and flows via line 31a to cyclone 33a. Heat transfer gas exiting cyclone 33a flows via valve 93a and line 65 to heat exchanger 9 where it is cooled. If the desired degree of cooling cannot be achieved with heat exchanger 9 alone, the heat transfer gas exiting oven 1 may first be directed via valve 60a and line 62 to the condenser 7.

The cooled heat transfer gas exiting heat exchanger 9 flows via line to blower 15 and is recirculated back to oven 2 via line 68, valve 69, valve 75b and line 76b. The heat transfer gas flows through inlet 28b of oven 2, through distributor 35b and into distillation chamber 4 where it again contacts and cools the char. During this cooling period, combustion air may be passed through the radiant heating tubes 41b of oven 2 to assist in cooling the oven and its contents.

Ovens 1 and 2 continue, as desired, to operate in off-set, batchwise distillation cycles. Preferably, the operating conditions are such that each oven completes a distillation cycle in about an eight hour period.

Once the char in the trucks removed from the ovens has cooled to about 40° C., it is unloaded from the trucks and subjected to secondary processing. If necessary, the cooled char is transferred to a magnetic separator where any steel components of the tires are separated from the char. Char leaving the magnetic separator may be treated for further removal of volatile material and final adjustment of char composition. For example, char from the magnetic separator may be introduced into a screw conveyor having a heat transfer jacket through which exhaust gas from the radiant heating systems is passed. As the char traverses the conveyor, it is heated from about 40° C. to at least about 500° C. Char exiting the conveyor passes through a valve to the inlet of a second screw conveyor having a heat transfer jacket through which cooling water is passed. Recooled char leaving the second screw conveyor is transferred to final classification. The resulting solid carbonaceous char can be placed in suitable containers and the steel baled for delivery to the customers. Secondary processing of the char increases the quality control and allows the distillation cycle time and distillation temperature to be reduced.

The burners are preferably controlled by an Andover digital control unit. The burners are modulated in a time proportioned mode to account for the sensitivity of the radiant burners. The Andover system may also control operation of the system blower to control the pressure within the distillation chambers as well as valve manipulation to control the flow of process gas through the system. The control unit reads the weight cells and produces the weight loss curve for the operator of the system.

To ensure that the rubber is destructively distilled and not burned, the distillation chamber must be sealable for the substantial exclusion of oxygen from the chamber. Thus, it is important that the door of the ovens not allow significant amounts of air (oxygen) to leak into the distillation chamber during the distillation process. Thus, ovens 1 and 2 further include means for sealing the respective distillation chamber by providing a substantially gas tight seal between door 25 and housing 20 when the door is in its closed position. In this manner, distillation chambers 3 and 4 may be sealed for the substantial exclusion of oxygen from the chamber during heating and distillation.

The sealing means may take various forms. For example, door 25 may be simply bolted to the housing 20 of the oven when in the closed position or the sealing means may comprise a mechanically operated over-the-center mechanism. Alternatively, the sealing means may comprise hydraulic or pneumatic pistons located in a position to act against the outside surface of door 25. After door 25 has been closed, the pistons are activated to move against the door, forcing the door into tight, flush engagement with the exterior surface of housing 20. In order to prevent deviations in door 25 and housing 20 as well as thermal warping during heating of the oven from undermining the integrity of the seal, the sealing means may further comprise one or more gasket members attached to the door or the housing around the periphery of the opening. The gasket members can be formed from any heat resistant compressible material such as teflon or ceramic fiber.

Figure 4:
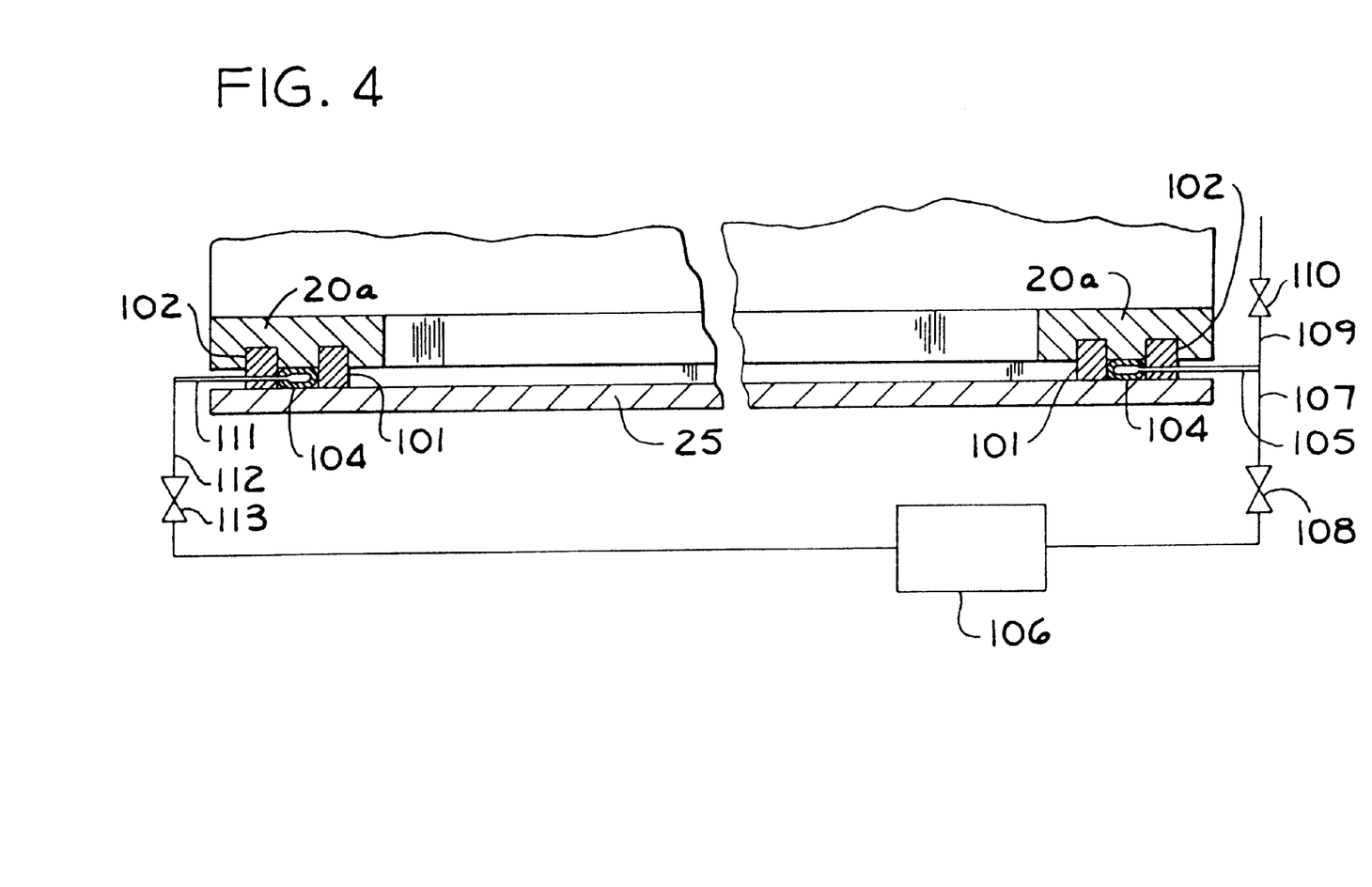
FIG. 4 is a cross-sectional view taken along line 4—4 of FIG. 3 showing a pressurized distillation oven door seal.

FIG. 4 is a cross-sectional view taken along line 4—4 of FIG. 3 showing an especially preferred sealing means of the present invention comprising a pressurized door seal. The pressurized door seal comprises an inner gasket member 101 and an outer gasket member 102. The gasket members 101 and 102 are annular in shape and are attached to one of door 25a and housing 20a around the periphery of the opening in the housing. As shown in FIG. 4, the gasket members are mounted in corresponding grooves in housing 20a which extend around the periphery of the opening in the housing. The gaskets are spaced relative to one another to accommodate an inflatable sealing tube member 104 between the gaskets when door 25a is in its closed position. Tube member 104 is made of a resilient material such as an elastomer. Tube member 104 is attached to one of door 25a and the housing 20a and is generally annular in shape, extending around the entire periphery of the opening in the space between gaskets 101 and 102. When door 25a is closed, gaskets 101 and 102 and tube member 104 are disposed in the gap formed between the door and housing 20a. The gaskets provide a seal between door 25a and housing 20a and protect the tube member from exposure to excessive temperatures.

The pressurized door seal further comprises means for selectively introducing a fluid into tube member 104. As shown in FIG. 4, the fluid introduction means may comprise an inlet member 105 in fluid communication with the interior of tube member 104. Inlet member 105 extends through outer gasket 102 and is in fluid communication with a pressurized fluid reservoir 106 via line 107 and valve 108. Once the oven is loaded and door 25a secured in its closed position, fluid is introduced into tube member 104 from reservoir 106 by opening valve 108. The fluid used to inflate tube member 104 may be either a gas such as air or a liquid such as water. As fluid is introduced into tube member 104, the increase in internal pressure forces the tube member to inflate and expand to sealingly engage door 25a and housing 20a, thereby substantially preventing air from leaking into the distillation chamber through the gap between the door and the housing. The sealing force of the pressurized door seal can be adjusted by controlling the quantity of fluid introduced into tube member 104. As the temperature in the oven increases during distillation, the fluid in tube member 104 expands and forces the tube member to remain in sealing engagement with door 25a and housing 20a despite thermal warping of the door or housing. The pressurized seal provides a substantially gas tight seal between door 25a and housing 20a which improves the quality of the hydrocarbon-containing vapor withdrawn from the oven and enhances the safety of the apparatus. The fluid introduced into tube member 104 may be removed via bleeder line 109 and valve 110. Removing the fluid collapses the tube member 104 so that the seal is protected when door 25a is opened.

Preferably, the pressurized door seal further comprises means for circulating a cooling fluid through tube member 104. As shown in FIG. 4, the cooling fluid circulation means may comprise an outlet member 111 in fluid communication with the interior of tube member 104. Outlet member 111 also extends through outer gasket 102 and is in fluid communication with pressurized fluid reservoir 106 via recycle line 112 and valve 113. If cooling is desired, the circulating fluid is preferably water. The fluid introducing means and cooling fluid circulation means are designed to permit the addition or removal of fluid from tube member 104 to control the internal pressure of the tube member and prevent the tube member from bursting.

In view of the above, it will be seen that the several objects of the invention are achieved.

As various changes could be made in the above-described process and apparatus without departing from the scope of the invention, it is intended that all matter contained in the above description be interpreted as illustrative and not in a limiting sense.

What is claimed is:

1. A batch process for the destructive distillation of rubber to produce hydrocarbon and solid carbonaceous char, the process comprising:

heating a rubber charge in a distillation chamber in the substantial absence of oxygen to a temperature sufficient to pyrolyze the rubber, distill a substantially oxygen-free process gas comprising hydrocarbon vapor from the rubber and produce a solid carbonaceous char, heat for the distillation of the rubber being supplied by a radiant heating assembly within said chamber;

cooling the process gas to partially condense the hydrocarbon vapor and produce a liquid fraction comprising hydrocarbon and a remaining gaseous fraction;

discontinuing heating of the rubber charge; and cooling the carbonaceous char by contacting the carbonaceous char with a heat transfer gas comprised of substantially oxygen-free process gas to transfer heat from the char to the heat transfer gas and thereby cool the char, the heat transfer gas circulating in a circulation loop, said circulation loop comprising cooling means for removing the heat transferred to the heat transfer gas from the char by indirect heat transfer.

2. The process as set forth in claim 1 wherein the weight loss of the rubber charge as a result of pyrolysis is monitored and heating of the rubber charge is discontinue in response to the weight loss of the rubber charge or is discontinued function of the weight loss of the rubber charge.

3. The process as set forth in claim 2 wherein heating of the rubber charge is discontinued when the rate of weight loss of the rubber charge approaches zero.

4. The process as set forth in claim 1 wherein said radiant heating assembly comprises radiant heating tubes in which a mixture of a hydrocarbon and an oxygen-containing gas is combusted.

5. The process as set forth in claim 4 wherein the oxygen-containing gas is air.

6. The process as set forth in claim 5 further comprising passing air through said radiant heating tubes after heating of the rubber charge in the distillation chamber is discontinued to assist in cooling the carbonaceous char.

7. The process as set forth in claim 4 wherein the hydrocarbon combusted in said radiant heating tubes comprises a portion of said remaining gaseous fraction.

8. The process as set forth in claim 4 wherein the process gas comprising hydrocarbon vapor is heated above its dew point with respect to the hydrocarbon using heat transferred from said radiant heating tubes to the process gas to produce a superheated process gas, and heat is transferred by indirect heat transfer from the superheated process gas to the rubber charge inside said chamber to contribute supplemental heat energy for distillation of hydrocarbon from the rubber.

9. The process as set forth in claim 8 wherein the process gas is heated to increase the temperature of the process gas by at least about 10° C.

10. A batch process for the destructive distillation of rubber to produce hydrocarbon and solid carbonaceous char, the process comprising:

loading a charge of rubber into a first distillation chamber;

heating the rubber charge in said first chamber in the substantial absence of oxygen to a temperature sufficient to pyrolyze the rubber, distill a substantially oxygen-free process gas comprising hydrocarbon vapor from the rubber and produce a solid carbonaceous char;

cooling the process gas to partially condense the hydrocarbon vapor and produce a liquid fraction comprising hydrocarbon and a remaining gaseous fraction;

loading a second charge of rubber into a second distillation chamber;

discontinuing heating of the rubber charge in said first chamber;

cooling the carbonaceous char in said first chamber by circulating a heat transfer gas comprised of substantially oxygen-free process gas in a circulation loop between said first chamber and said second chamber, the heat transfer gas contacting the carbonaceous char in said first chamber and contacting the second rubber charge in said second chamber such that heat is transferred from the carbonaceous char to the heat transfer gas in said first chamber to cool the char, and heat is transferred from the heat transfer gas to the second rubber charge in said second chamber to preheat the second charge, said circulation loop comprising cooling means for removing heat from the heat transfer gas by indirect heat transfer; and continuing to heat the preheated rubber charge in said second chamber in the substantial absence of oxygen to a temperature sufficient to pyrolyze the rubber, distill substantially oxygen-free process gas comprising hydrocarbon vapor from the rubber and produce a solid carbonaceous char, heat for the distillation of the rubber in said first and second chambers being supplied by a radiant heating assembly within each of said first and second chambers.

11. The process as set forth in claim 10 wherein the heat transfer gas is circulated between said first and second chambers for a time sufficient that the temperature differential between the char in said first chamber and the rubber charge in said second chamber is less than 10° C.

* * * * *

UNITED STATES PATENT AND TRADEMARK OFFICE
CERTIFICATE OF CORRECTION

PATENT NO. : 6,372,948 B1
DATED : April 16, 2002
INVENTOR(S) : V.J. Flanigan

It is certified that error appears in the above-identified patent and that said Letters Patent is hereby corrected as shown below:

<u>Column 14,</u>
Line 45, "discontinue" should read -- discontinued --.
Lines 46-47, "or is discontinued function of the" should read -- or a function of the --.

Signed and Sealed this

Twenty-second Day of October, 2002

*Attest:*

*Attesting Officer*

JAMES E. ROGAN
*Director of the United States Patent and Trademark Office*